Aug. 7, 1928.
F. F. PEASE
1,679,371
CONFECTIONERY APPARATUS
Original Filed Jan. 6, 1923     3 Sheets-Sheet 1
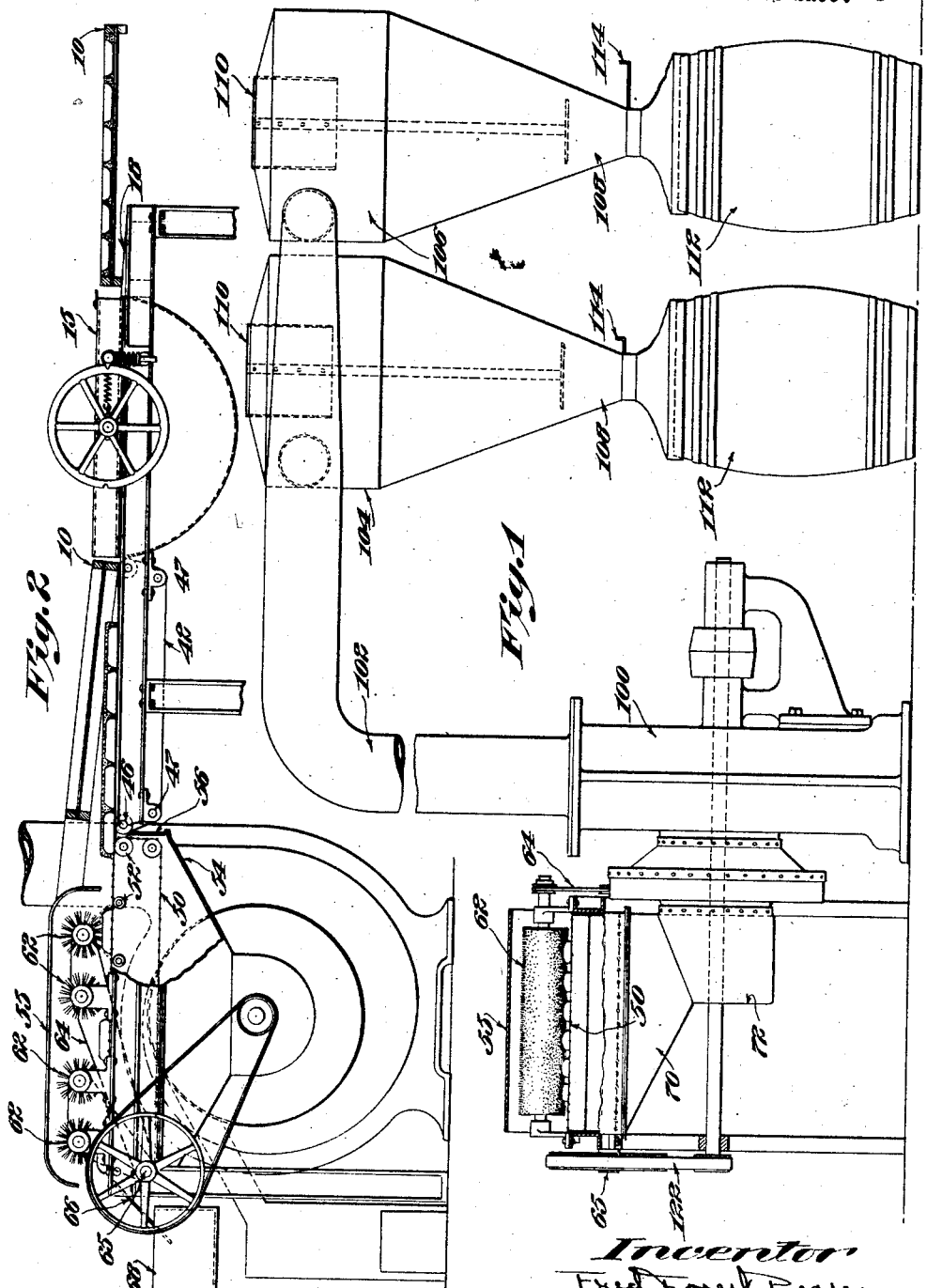

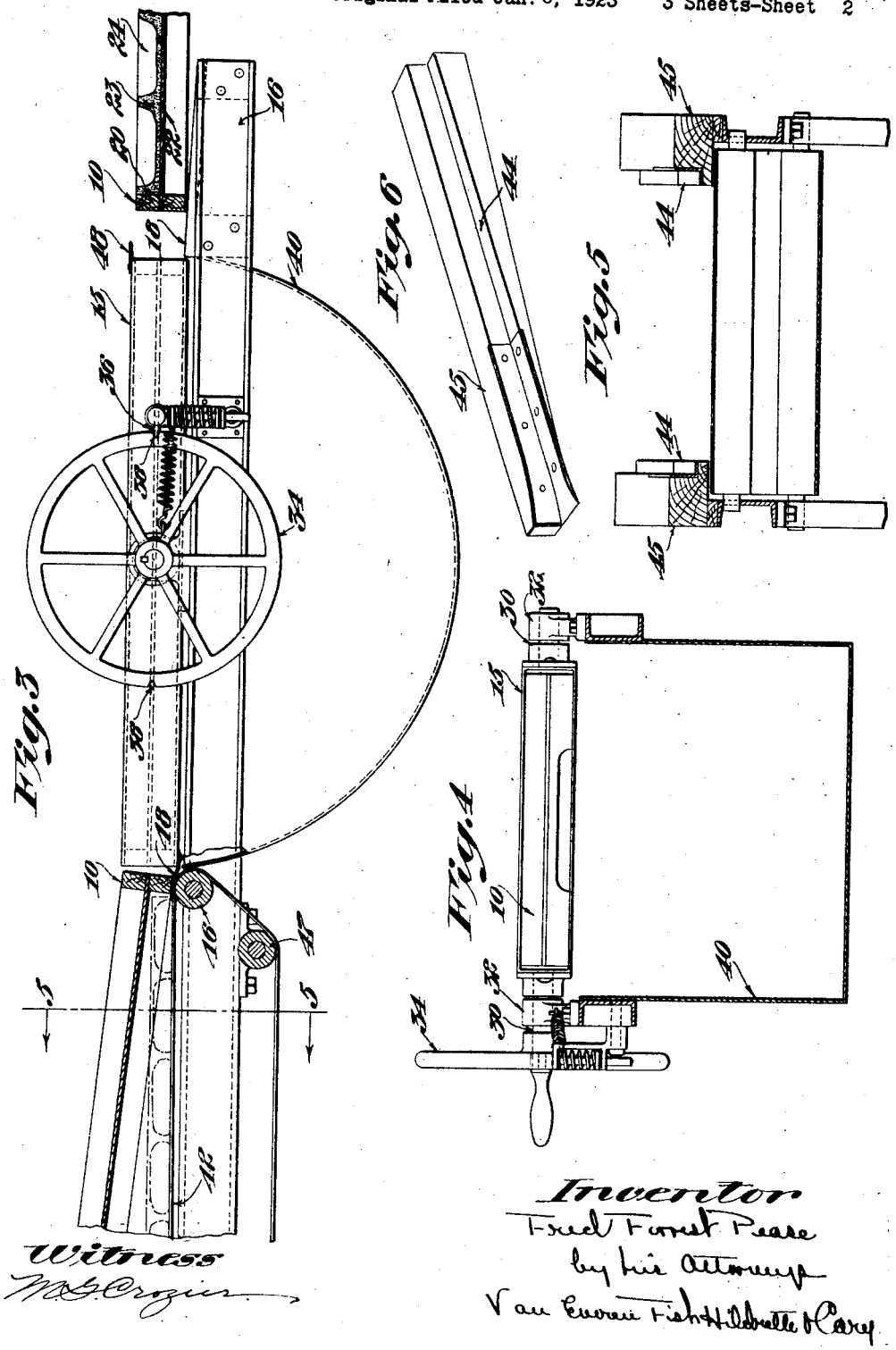
Aug. 7, 1928.
F. F. PEASE
1,679,371
CONFECTIONERY APPARATUS
Original Filed Jan. 6, 1923    3 Sheets-Sheet 2

Aug. 7, 1928.
F. F. PEASE
1,679,371
CONFECTIONERY APPARATUS
Original Filed Jan. 6, 1923   3 Sheets-Sheet 3
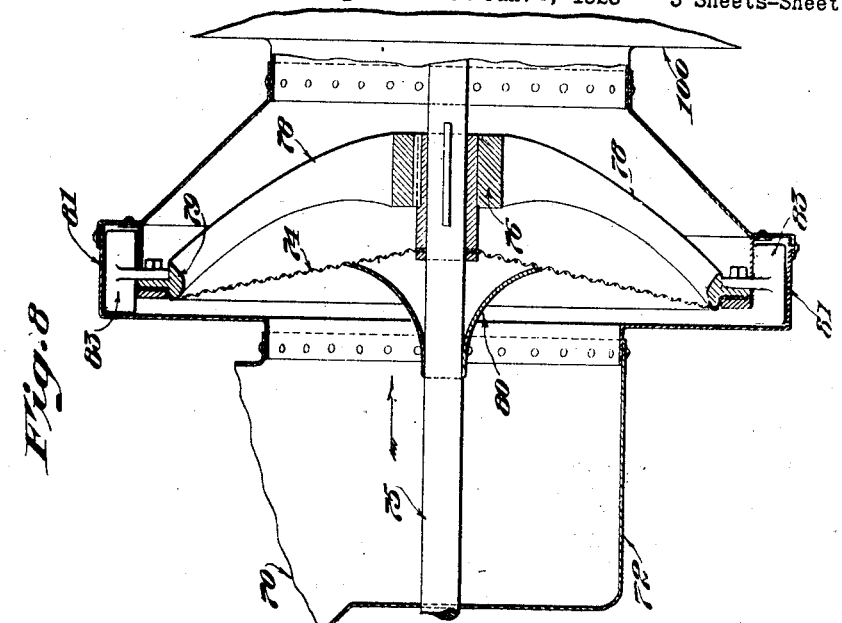
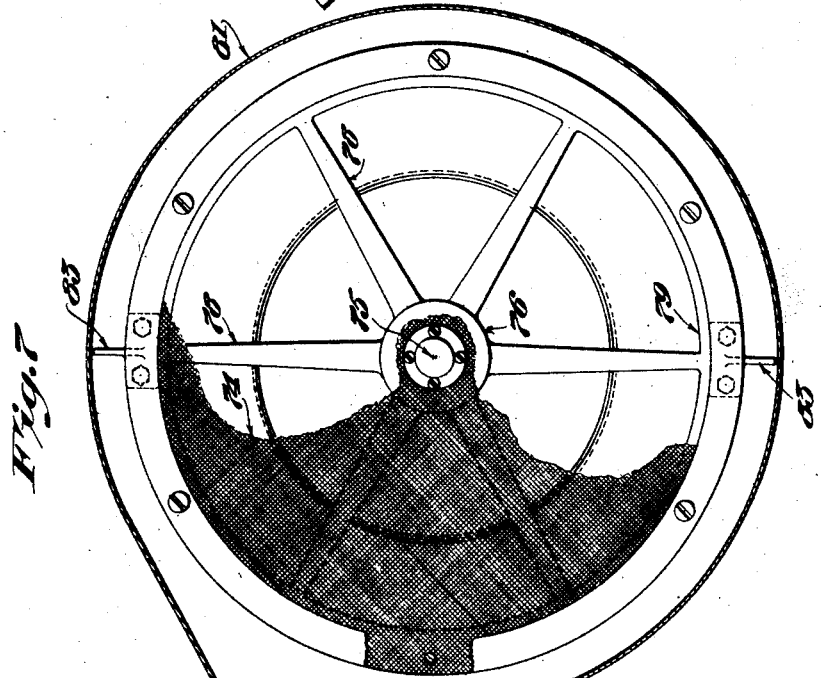

Patented Aug. 7, 1928.

1,679,371

UNITED STATES PATENT OFFICE.

FRED FORREST PEASE, OF EAST BRAINTREE, MASSACHUSETTS, ASSIGNOR TO F. F. PEASE INC., OF BOSTON, MASSACHUSETTS, A CORPORATION OF MASSACHUSETTS.

CONFECTIONERY APPARATUS.

Application filed January 6, 1923, Serial No. 611,192. Renewed November 30, 1927.

The present invention relates to a method and apparatus employed in connection with the manufacture of confectionery.

In the manufacture of chocolate coated articles of various shapes it is customary to shape the cream or fondant centers of the articles in mold cavities formed in a bed of starch. Ordinarily the containing tray is filled with finely divided starch having a plurality of mold cavities of the desired shape formed therein in which the fondant is poured and allowed to harden. After the cooling and hardening of the fondant centers, it is necessary to remove them from the mold cavities and clean and dry the starch before it may be used once more. The complete removal of the starch from the fondant centers with the subsequent cleansing and drying of the starch itself constitutes a serious problem in the manufacture of candy.

According to the present invention, a complete separation of the fondant centers and starch is effected and thereafter the starch is cleaned and dried rapidly and thoroughly. The separation of the starch from the fondant centers is accomplished with a minimum handling and breakage of the centers and without the necessity of disturbing the prearranged order and arrangement of the centers. This feature is of importance in connection with the later enrobing operation, as it permits the centers to be delivered to the coating machine without the necessity of subsequently positioning them in an orderly arrangement for the enrobing machine.

An important feature of the present invention resides in the fact that particles of sugar and other foreign matter are separated from the starch and the starch itself is completely dried in a minimum of time and in a single operation. It will be understood by those skilled in the art that the usual methods of drying starch by circulation of drying air in an open room are not only slow and laborious but the finely divided starch dust picked up and carried by the air and deposited about the room constitutes a distinct fire hazard.

The invention consists primarily in the employment of an air current of sufficient force and proper direction to completely remove the starch surrounding the fondant centers either alone or in conjunction with additional means for breaking up the bed of starch and for conveying the starch, together with the particles of sugar and other foreign matter mixed therein, away from the candy. Thereafter the starch is separated from its mixture with the tailings by the employment of a new and novel form of separating device, which effects a complete separation of the tailings and foreign material from the starch with great rapidity. To this end, a revolving screen is located in the air duct and is so designed and rotated that the starch is caused to pass through the openings in the screen with the air current and the heavier particles of sugar and foreign material impinge against the screen and are diverted into a separate chamber through the action of centrifugal force. Subsequently to the separation of the sugar from the finely divided starch, the latter is deposited from the air current in a suitable form of settling chamber or other separating device.

The removal and cleansing of the starch in this manner thoroughly dries and cleanses it and leaves the body of starch in a finely divided fluffy condition, which is ideally adapted for the formation of the cavity molds. In this connection it should be understood that starch which has not been properly cleansed of sugar and dried becomes dirty and sticky and cannot be separated from the fondant centers after they have hardened in the mold cavities.

A further advantage of the present invention resides in the fact that according to this method the operations of separating the starch from the candy and cleansing the starch are carried on within closed compartments and the fire hazard which is very great in ordinary methods of handling the starch is greatly reduced.

Still further features of the invention consist in certain novel features of construction, combinations and arrangements of parts hereinafter described and claimed, the advantages of which will be obvious to those skilled in the art from the following description.

In the accompanying drawings illustrating the preferred form of the invention Fig. 1 represents an elevation partly in section of an apparatus embodying the features of the invention; Fig. 2 is an elevation taken at right angles to Fig. 1; Fig. 3 is a detail illustrating an elevation partly in section of the apparatus for handling the trays of starch; Fig. 4 is an end elevation partly in section of the handling apparatus shown in Fig. 3; Fig. 5 is a cross section of the feeding belt and table taken on line 5—5 of Fig. 3; Fig. 6 is a detail illustrating the guide rails for elevating the starch trays from the bed of starch; Fig. 7 is a detail illustrating an elevation of the separator screen, together with the accompanying mechanism; and Fig. 8 is a detail illustrating a section in elevation of the separator screen shown in Fig. 7 with the accompanying parts.

According to the illustrated embodiment of the invention, a tray of usual form containing a series of fondant centers in a bed of starch is delivered manually or otherwise to a mechanism which reverses the position of the tray and permits the fondant centers in the bed of starch to be delivered from the tray directly upon a feed belt or similar form of conveyor. The delivery of a succeeding tray of starch to the reversing mechanism delivers the first tray to the conveyor belt, suitable guide mechanism serving to remove the tray from the bed of starch, leaving the latter deposited upon the belt. Thereafter the bed of starch, together with the fondant centers, is delivered into a region having a moving current of air of sufficient strength to remove the starch and similar loose particles from the relatively larger fondant centers, this separating operation being aided by the employment of suitable cleaning instrumentalities. The starch and similar matter which has been picked up by the air current is then delivered to a rapidly rotating separator screen designed in such a manner that the sugar and heavier particles are separated from the starch which passes through the screen and are thrown by centrifugal force to the outer periphery of the screen from which they are guided into a collecting chamber. The starch thus separated from the sugar and similar matter is then delivered to a settling chamber, in which the starch is deposited in the form of a dry, fluffy mass, the air being delivered from the settling chamber substantially free of starch.

Referring to the drawings, it will be observed that the starch tray indicated at 10 is first delivered to a reversing mechanism which comprises essentially a hollow casing 15 of rectangular cross section, which slidingly receives the starch tray, as indicated in Fig. 4. The frame 16 of the machine may be conveniently provided with inclined guideways 18 to facilitate entering the tray into the receptacle 15, as indicated in Fig. 3.

It will be evident to those skilled in the art that the starch tray comprises a frame 20 having an imperforate bottom 22 upon which a starch bed, indicated at 23, rests. A series of mold cavities are formed in this starch bed in the usual manner and serve to mold and shape the fondant centers, which are indicated generally at 24. With this in mind, it will be obvious that by reversing the position of the tray the fondant centers, together with the surrounding bed of starch, may be conveniently deposited and separated from the tray 10. To this end the receptacle 15 is provided with oppositely extending trunnions 30, which are mounted in bearings 32 formed upon the frame and which serve to permit the receptacle 15 to be bodily revolved, reversing the position of the starch tray carried therein. This reversing movement of the receptacle may be conveniently accomplished through a hand wheel indicated at 34, which is connected to one of the trunnions 30 and which is rotated through 180° to reverse the position of the receptacle 15. The hand wheel may be retained in either one of two operative positions by a spring pressed detent 36, which engages in locking recesses 38 formed upon opposite sides of the periphery of the hand wheel. During the reversal of the starch tray, the latter is retained in place within the receptacle through the provision of a curved guide 40, which serves to close the open end of the receptacle 15 and retain the tray in place during the reversing movement in a manner which will be evident to those skilled in the art. After the position of the starch tray has been reversed, it is delivered from the open ended receptacle 15 onto a conveyor belt 42 by the entrance of the next succeeding starch tray into the receptacle. The bed of starch and the fondant centers are deposited upon the belt and the tray itself is elevated through engagement with inclined guide rails 44 formed upon side members 45, as shown in Figs. 5 and 6. The feed belt, as indicated clearly in Fig. 3, passes at opposite ends over upper supporting rolls 46 and lower supporting rolls 47. The tray is guided from the receptacle onto the belt and loss of starch between the receptacle and the belt is prevented by an apron 48 secured to the under portion of the receptacle and projecting over the belt. As indicated in Fig. 3, each end of the receptacle is provided with such an apron. In order to initially break up and separate the bed of starch from the fondant centers, the starch, together with the fondant centers, is transferred from the primary conveyor belt 42 onto a secondary belt 50, traveling at a higher rate of speed. This progressive transfer of the bed of starch from one belt to another traveling at a different rate of speed serves to pull the mass of starch apart and to effectually break it up. As indicated, the upper surfaces of the two belts are supported at the same level, the belt 50 being supported upon a series of guide rolls 52. The region traversed by the conveyor belt 50 is substantially completely enclosed by a casing, indicated generally at 54, and an upper casing or hood 55. A strong current of air is induced in this region to remove the broken mass of starch from the fondant centers and convey it away therefrom. In order to permit this removal of the starch by the air current, the belt 50, as indicated in Figs. 1 and 2, may conveniently be formed of a perforated sheet, an open screen or similar construction having openings of ample size to permit the starch to pass therethrough but too small to permit the passage of the fondant centers. In this connection it will be observed that the casing 54 is provided with an upstanding wall 56 positioned closely adjacent the guide roll 46 and serving to guide any starch which may pass downwardly between the guide rolls 46 and 52 into the air conduit. The process of removing the starch from the fondant centers through the moving air current is aided by a series of cleaning brushes 62, which lightly engage with the top portions of the fondant centers as the latter pass thereunder to loosen and remove the starch therefrom. These brushes are conveniently rotated in any suitable manner, as by driving belts 64 connected with a drive shaft 65. The fondant centers may be handled in any desired manner after removal of the starch therefrom but in the illustrated embodiment of the invention are simply discharged upon an inclined surface 66, which delivers them to a collecting receptacle 68. After its removal from the fondant centers, the separated mass of starch is carried by the moving current of air downwardly through a closed conduit 70 and transversely to a separating chamber 72. The starch filled air upon its entrance into the separating chamber engages with a revolving separator screen 74 which permits the air to pass freely therethrough but which engages and separates from the air a portion of the suspended matter. It is possible to so design the separator screen that the suspended matter will be completely separated from the air but in actual practice it is desirable that particles of the sugar or tailings shall be separated from the mass of starch and to this end the separator screen is designed to remove the relatively larger particles of sugar while offering no substantial impedance to the passage of the starch and air therethrough. The revolving screen, as indicated clearly in Figs. 7 and 8, is mounted upon a shaft 75 to which is connected a spider 76 having a plurality of radiating arms 78 supporting a rim 79 to which the periphery of the screen is connected. The central portion of the screen is rendered inoperative through the employment of a substantially conical head 80 which is supported upon the shaft 75 and prevents the engagement of the suspended matter with the inner surface of the screen. The particles of sugar or tailings impinge upon the inclined surface of the revolving screen and are thereafter thrown outwardly by centrifugal force into an annular collecting chamber 81. The collecting chamber is maintained clear of tailings through the employment of a plurality of blades 83 which are connected to the periphery of the spider and revolve at high speed in the annular chamber. These blades serve to discharge the tailings from the annular chamber into a discharge duct 85. By providing a separator screen having an inclined surface, it is possible to effect a separation of suspended matter from the air current with the employment of screen openings which are as large or larger in area than the matter to be separated. Such a construction has the distinct advantage that no substantial impedance is offered to the flow of the air through the screen while at the same time a substantially complete separation of the suspended matter from the air is effected. The air with the starch contained therein, after its passage through the separator screen, continues through a blower indicated generally at 100 and from the blower is caused to flow along a duct 102 communicating with separate chambers 104 and 106. The starch laden air is directed into the upper portion of the chambers 104 and 106 in a tangential manner and the starch is gradually separated from the air and deposited in the lower neck 108 of the chamber. The air, after being freed from the starch, passes outwardly through openings 110 formed in the upper portions of the chambers. The starch after its collection in the lower portion of the chambers may be periodically discharged into containers 112 through the provision of a slide valve or gate indicated at 114. This particular method of effecting a final separation of the starch from the air is a common expedient in apparatus of this character and specifically forms no part of the present invention. As indicated in Fig. 1, the shaft 75 to which the fan or blower and separator are connected is employed for operating the conveyor belt 42 and cleaning brushes 62 through a counter-shaft 120 driven from a belt 122 and connected to the conveyor belt and cleaning brushes through suitable belt connections.

The apparatus, as hereinbefore described, for removing the starch from the fondant centers and thereafter cleaning the starch not only permits large volumes of starch to be handled simply and expeditiously but in addition has the further advantage that the starch is substantially completely dried and is returned to a condition favorable for reuse. It will be obvious that if the air employed for removing the starch contains a relatively small moisture content the removal of excess moisture from the starch will be effected by the air and the starch will be finally deposited from the air in a dry, fluffy condition.

It will be evident to those skilled in the art that although the illustrated embodiment of the invention indicates a conventional form of apparatus for effecting a final separation of the starch from the air, this separation may be conveniently effected through the use of a revolving screen of proper design interposed in the path of the starch laden air after the initial separation of the tailings from the starch has been completed.

While it is preferred to employ the specific construction and arrangement of parts shown and described it will be understood that this construction and arrangement is not essential except so far as specified in the claims and may be changed or modified without departing from the broader features of the invention.

The invention having been described, what is claimed is:

1. That step in the manufacture of confectionery which consists in subjecting a broken up mass of starch containing particles of sugar to an air current of sufficient volume and velocity to pick up and convey the starch and sugar with the air, removing the heavier sugar particles from the starch impregnated air by a revolving screen, separating the starch from the air, and collecting the starch in a dry, fluffy condition.

2. That step in the manufacture of confectionery which consists in initially breaking up a mass of starch in which fondant centers are embedded, removing the thus broken up starch and particles of sugar from the centers by a moving current of air, and progressively separating the suspended matter and starch from the current of air.

3. Apparatus for the manufacture of confectionery comprising means for supporting a mass of starch, means for removing the starch with an air current, and a revolving screen for separating suspended matter from the air current.

4. Apparatus for the manufacture of confectionery comprising means for supporting a mass of starch with fondant centers embedded therein, cleaning brushes adapted to engage with and break up the mass of starch surrounding the centers, means for directing a current of air about the starch to pick up the starch and remove it with the air current, and a revolving screen designed to separate the suspended matter from the air.

5. Apparatus for the manufacture of confectionery comprising means for receiving a tray of starch, means for reversing the position of the tray, a moving conveyer adapted to receive a mass of starch deposited upon the tray, means for breaking up the starch received by the conveyer, means for directing an air current about the starch in a manner to pick up the starch in the air current together with small particles of sugar, means for normally separating sugar and other heavier particles from the starch and air, and means for finally separating the finer particles of starch from the air.

6. Apparatus for the manufacture of confectionery comprising a screen surface for supporting a mass of starch with fondant centers embedded therein, means for inducing a current of air downwardly through the screen surface and the mass of starch supported thereon, and a revolving screen surface located in the path of the air current and designed to separate suspended matter from the air.

7. Apparatus for the manufacture of confectionery comprising a screen surface adapted to support a mass of starch with fondant centers embedded therein, means for inducing a current of air through the screen surface and mass of starch supported thereby to remove particles of starch and sugar surrounding the centers, a revolving screen located in the air current designed to separate particles of sugar from the starch and air, and means for finally separating the starch from the air.

8. Apparatus for the manufacture of confectionery comprising a screen surface designed to support a mass of starch with fondant centers embedded therein, a blower, an air duct connecting the blower and screen surface and designed to cause a draft of air through the screen surface and mass of starch supported thereby, and a revolving screen separator located in the duct between the screen surface and blower.

9. Apparatus for the manufacture of confectionery comprising means for supporting a mass of starch with fondant centers embedded therein, a series of cleaning brushes designed to engage with the mass of starch in a manner to break up the mass of starch, means for inducing a current of air to pick up the starch and particles of sugar mixed therewith, and a revolving screen for separating suspended matter from the air current.

10. Apparatus for the manufacture of confectionery comprising a conveyer belt having an imperforate surface adapted to receive a mass of starch, means for operating the belt, a second conveyer belt having a screen surface, means for operating the second belt at a higher rate of speed than the first belt, and means for inducing a current of air through the screen surface of the second belt.

11. An apparatus for the manufacture of confectionery comprising means for supporting a mass of starch with fondant centers embedded therein, means for creating an air current to remove the starch with particles of sugar contained therein, a revolving screen separator, means for directing the air impregnated with starch and sugar against the separator to cause the sugar to be separated thereby and the starch impregnated air to pass therethrough, and means for finally separating the starch from the air.

FRED FORREST PEASE.